United States Patent [19]

Adamian

[11] 3,769,519

[45] Oct. 30, 1973

[54] AUTOMATIC HEADLIGHT CONTROL

[76] Inventor: Michael R. Adamian, 149 Tanoak Lane, Naperville, Ill. 60540

[22] Filed: Oct. 12, 1972

[21] Appl. No.: 296,954

[52] U.S. Cl. .............................. 307/10 LS, 315/83
[51] Int. Cl. .............................................. H02g 3/00
[58] Field of Search ............... 307/10 LS, 116, 117; 315/83, 82

[56] References Cited
UNITED STATES PATENTS
3,694,690 9/1972 Shimizu et al. ...................... 315/83

Primary Examiner—Herman J. Hohauser
Attorney—Leonard S. Knox

[57] ABSTRACT

Compact, reliable apparatus operating on electronic principles with no electromechanical parts serves two purposes: one, when the engine is running, to turn on the headlights of a motor vehicle automatically when the ambient level of illumination is such that the headlights should be "on," e.g. at twilight, and, two, to turn the headlights "off" automatically in the event the engine stops running. In another aspect, this invention completely eliminates the headlight switch presently used, and performs identical functions through electronic circuitry. It can be modified to operate in conjunction with a headlight switch. In both cases, undesirable battery drain is avoided since it is impossible to stop the vehicle and have the lights accidentally "on." The circuitry is so arranged that the lights remain "on" for a predetermined interval following "switching off" of the ignition system.

8 Claims, 4 Drawing Figures

AUTOMATIC HEADLIGHT CONTROL

BACKGROUND OF THE INVENTION

It is a common shortcoming for the driver of a motor vehicle to be completely oblivious to a slowly darkening sky and fail to turn on the headlights. The hazards thus engendered are obvious. The present invention eliminates any conscious effort on the part of the driver to turn the lights on or off but depends only on the fact that the engine is running and that the ambient illumination is at a level whereat the driver would normally turn on the lights.

In the other aspect, it is recognised that a driver will park his car, turn off the ignition and inadvertently leave the light switch "on." If the hiatus is unduly long, the battery will become exhausted. The present invention incorporates means interrelating the ignition system with the circuit controlling the headlights. Thus, if the invention apparatus fails to sense ignition pulses for a predetermined short interval (and the light switch is "on"), the headlight circuit will be interrupted until such time as ignition pulses are sensed again. Under these circumstances, the operator re-establishes headlight command by running the engine and generating ignition pulses.

SUMMARY OF THE INVENTION

The foregoing objects can be attained with the present invention by the use of electronic components capable of being contained in a case of only a few cubic inches capacity. In this way, the package, including a heat-sink, can be installed behind the dashboard and the ambient illumination sensor can be mounted near the windshield in an unobtrusive position, and if the windshield is clean, as it usually is, the light sensitive element will function accurately.

The apparatus comprises an ignition pulse sensor to detect the presence or absence of ignition pulses which are taken from the primary side of the ignition coil, and an illumination sensor to measure the degree of ambient illumination. The output of both sensors is fed to a nand gate and, if the prescribed conditions are met, the output of the gate is inverted and fed as a trigger pulse to a pulse generator, e.g. a monostable multivibrator. The successive ignition pulses trigger the multivibrator which, once triggered, remains triggered due to succeeding trigger pulses which constitute a train shorter than the multivibrator output pulse. This latter conditions a control circuit comprising a suitable relay, e.g. a silicon controlled rectifier which, upon conduction, completes a circuit for the headlights.

The factor of ambient illumination is introduced into the circuit as the output of a photoelectric device. Assuming that the level of ambient illumination regains its normal intensity, the photoelectric device is effective, through the circuit to be described, to turn the lights off automatically.

In the event of an emergency and the engine has stopped or has to be stopped, and the lights are to be turned on, an emergency switch can be used to turn the lights on.

Now, if the driver should leave the vehicle with the ignition turned off, absence of ignition pulses leaves the multivibrator untriggered and the resulting output pulse which maintains the headlights "on," will turn the lights "off." Should the driver wish to park the vehicle with the headlights "on", the "off" condition which would otherwise result from absence of ignition pulses may be negated by using the emergency switch.

DESCRIPTION OF THE PREFERRED EMBODIMENT

Figure 2:
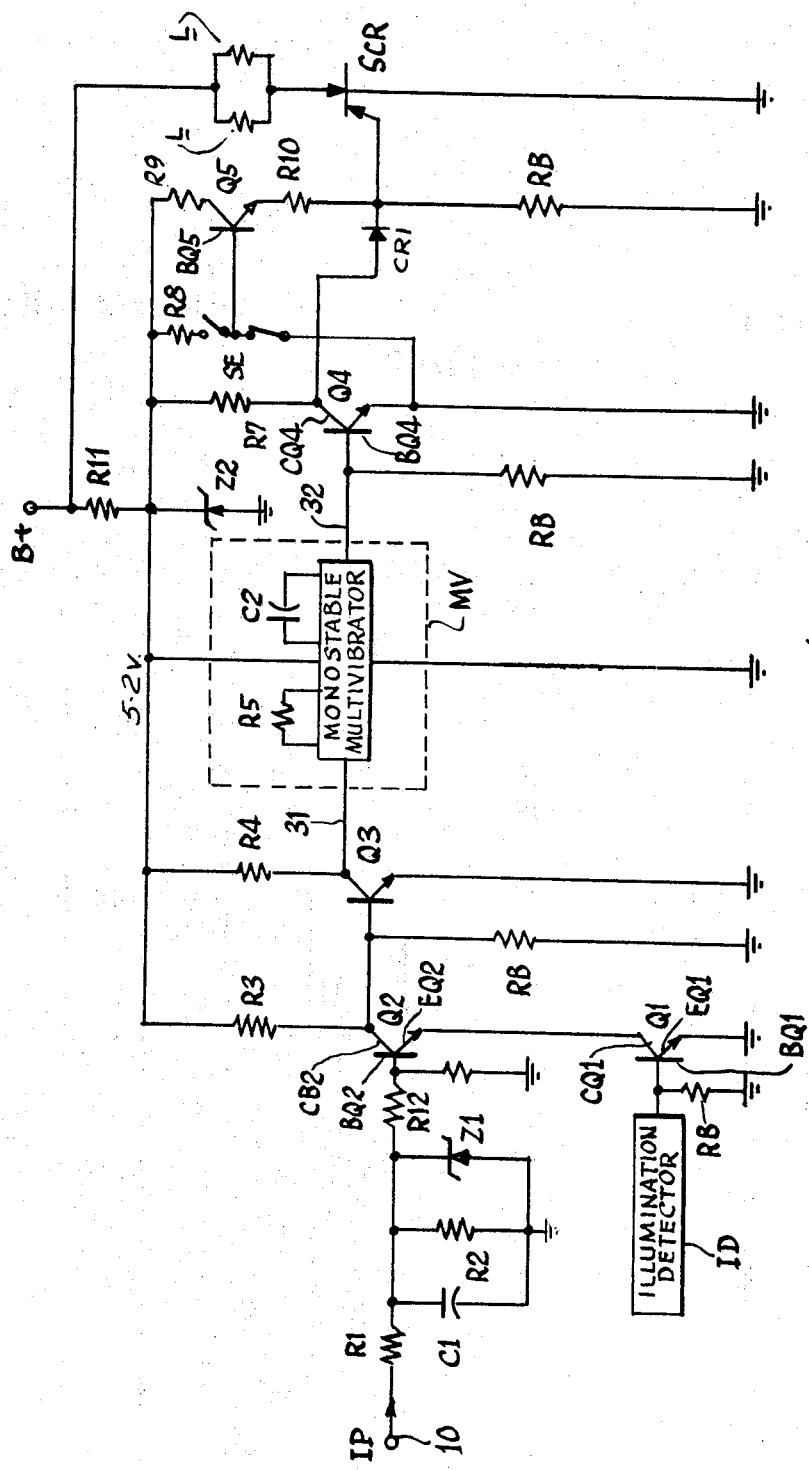
FIG. 2 is a schematic showing of the complete system.

Ignition pulses IP are taken off the primary coil of the ignition system of the vehicle and are applied at terminal 10 (FIG. 2). Resistors R1 and R2 constitute a voltage divider. In the example, R1 is 50K ohms and R2 is 5K ohms, so that, based on a voltage at IP of 100v, the voltage across R2 will be at least 9v for a short time. Since the ignition detector will respond to an input voltage as low as 4v, the voltage division indicated is sufficient. If R1 is 50K ohms or greater, the ignition coil will not be loaded inordinately by the ignition sensing portion of the circuit described. C1, in parallel with R2, together with Zener diode Z1, which acts as a clipper, serves to protect the transistor Q2 against otherwise destructive ignition pulses. In the event of a transient ignition pulse, Z1 clips the same to a safe voltage, e.g. 5.2v. The ignition pulses are applied to the base of an NPN transistor, Q2, via the resistor R12. At this point, it is to be noted that all resistors indicated on the drawings as RB are for applying the required forward bias current to the respective bases of the several transistors and to protect them from noise which might result in false turn-on.

Emitter EQ2 is connected to the collector CQ1 of an NPN transistor Q1. The emitter EQ1 goes to ground. The output of the illumination detector ID, e.g. a photo-darlington connects to base BQ1. Should ambient illumination exceed some predetermined level, Q1 turns off and, vice versa, Q1 turns on when the illumination drops below said level. Thus, if either Q1, Q2, or both are off, base current will flow through Q3 which is operated at saturation. As a result, the input 31 to the multivibrator will be held at ground level and, therefore, the multivibrator output at 32 will be a continuous high. The output at 32 is applied to BQ4 and Q4 will be biased "on." CQ4 is connected to the gate of a silicon controlled rectifier SCR so that the SCR remains "off".

Since, as shown in FIG. 2, the circuit to the lights (head and tail lights) L,L is completed from B+ through the SCR, when the latter is non-conductive, the lights remain off, i.e., the ambient illumination is at, or above, the predetermined level.

Typical ignition firing voltages, as viewed from the primary of the ignition coil are approximately 100v, as mentioned previously. The R1–R2 divider network applies a fraction of the voltage to BQ2, say about 0.9v. Since Q2 inverts the ignition pulses once, a re-insertion is necessary before the ignition pulse information may be applied to the multivibrator, and this result is obtained through Q3.

At this juncture, it is to be noted that the engine is running (condition one) and that the level of ambient illumination (condition two) has fallen below the predetermined value. Thus, as soon as the multivibrator is triggered by the first ignition pulse, it generates an output pulse (based on parameters to be discussed hereinafter) of 37.5 milliseconds duration. If the engine is at idle speed or above, this time will be sufficient to hold Q4 "off" for a period of time extending beyond the succeeding ignition pulse.

Figure 4:
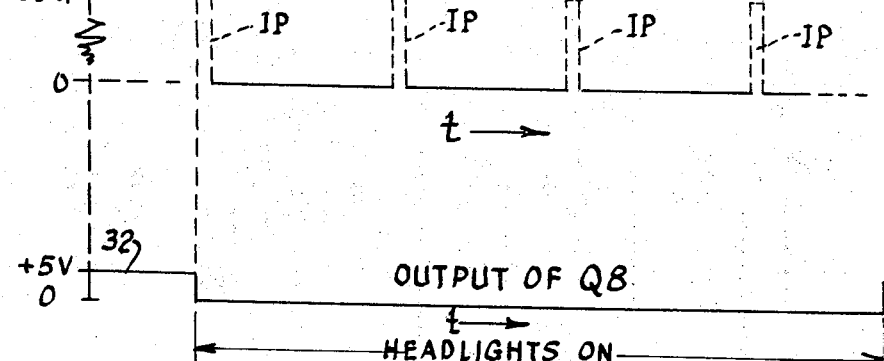

Reverting to FIG. 4, the ignition pulses are indicated at IP at an assumed amplitude of 100v. Input to the multivibrator are pulses of sufficient amplitude and the output 32 has a prolonged pulse of zero volts amplitude. Q4 turns off which causes the SCR to turn on. Thus, the lights turn "on." Since the width of the multivibrator output pulse is designed to be longer than the space between consecutive ignition pulses, the multivibrator remains continuously triggered until one of the two conditions is absent, i.e., the engine is turned off or the ambient illumination reaches or exceeds the predetermined norm.

As the ignition pulse repetition rate increases, the period decreases, while the multivibrator pulse width remains constant; the SCR and the headlights are "on." In the event Q1, Q2 or both turn off, Q3 will turn "on" which, in turn, causes the lights to be "off."

The invention includes provision for allowing the lights to be turned on even though the engine is not running. Thus, in FIG. 2, an emergency switch SE, e.g. a micro-switch or an additional pair of contacts added to the existing emergency switch, with rating of 10ma, is arranged to switch "on" and SE conducts current in the order of 5ma. Normally, BQ5 is grounded and Q5 is "off." Under these circumstances, the SCR is controlled by Q4. If SE is shifted to its alternate position, the SCR is controlled directly by Q5 and the headlights will be turned "on," irrespective of the multivibrator output. CR1 blocks the current from CQ4 and forces emitter current from Q5 to flow into the gate of SCR.

For convenience of understanding, the possible combinations of ambient illumination and engine conditions are tabulated:

| Illum. | Engine | SE | Q4 | SCR | Headlights |
|---|---|---|---|---|---|
| Low | Off | Off | On | Off | Off |
| High | On | Off | On | Off | Off |
| Low | On | Off | Off | On | On |
| High | Off | Off | On | Off | Off |
| Low | Off | On | | On | On |
| High | On | On | | On | On |
| Low | On | On | | On | On |
| High | Off | On | | On | On |

Figure 1:
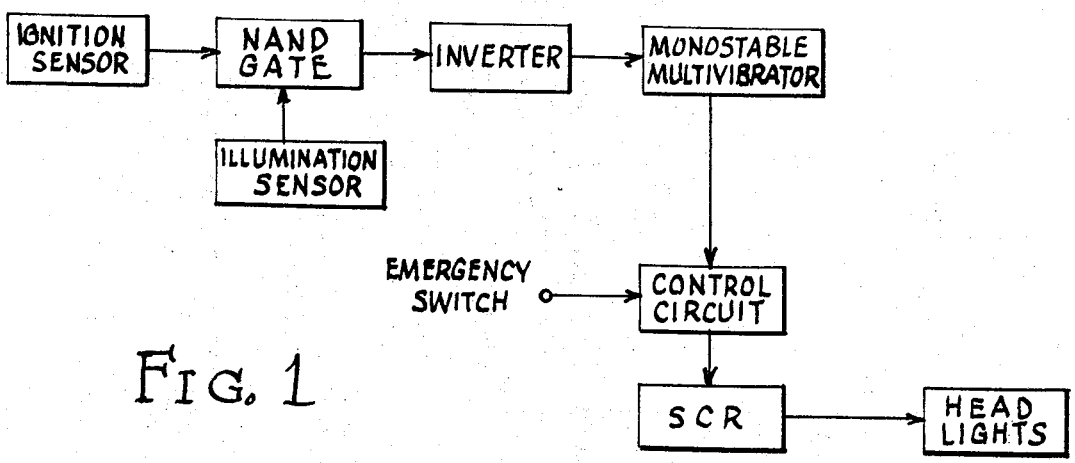
FIG. 1 is a block diagram of a preferred embodiment of the invention.

The exemplificative circuit thus far described is shown in block form in FIG. 1. It is believed that the same will be clear from what has preceded.

Specifications of the components of the exemplificative arrangement of FIG. 2 are as follows:

Illumination Sensor, Motorola Photo-Darlington Amplifier Type 2N5777, or equivalent
Z1, Z2, Motorola Type 1N3732, or equivalent
SCR, Texas Instrument Type 2N683A, or equivalent
NPN Transistors Motorola Type 2N6531, or equivalent
R1 = 50K
R2 = 5K
R3 = 3.6K
R4 = 3.6K
R5 = 25
R7 = 100
R8 = 1K
R9 = 100
R10 = 10
R11 = 150
R12 = 1K
R13 = 40
R14 = 40
R15 = 1K
R16 = 20
R17 = 1K
R18 = 1K
R19 = 3.6K
RB = 10K each
C3 = 0.01 $\mu f$
CR2)
CR3) = Motorola 1N4001 or equivalent
CR4)
C1 = 0.01 $\mu f$
C2 = 0 $\mu f$

MULTIVIBRATOR

Figure 3:
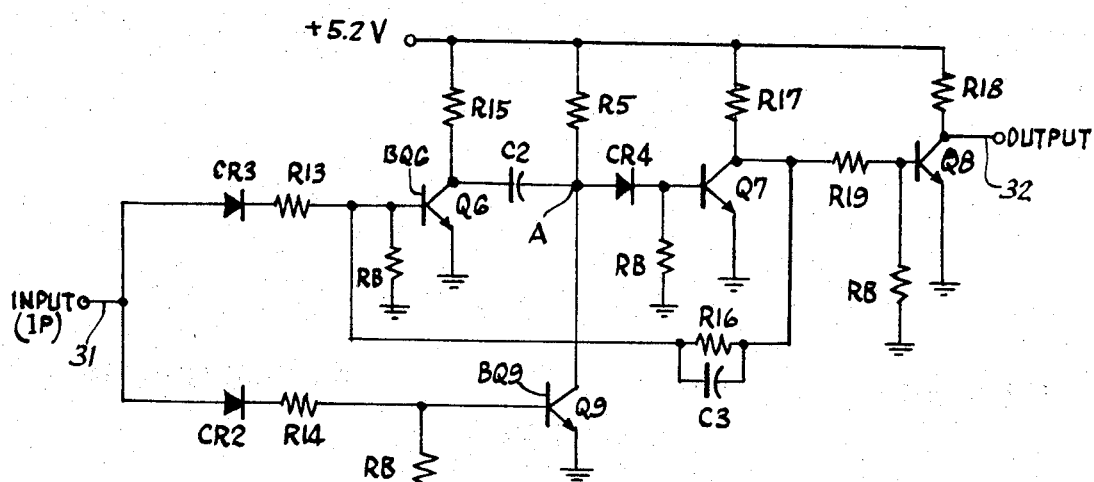
FIG. 3 is a schematic showing a preferred form of constantly triggered pulse generator, for example, a modified monostable multivibrator; and, FIG. 4 is a pair of graphs showing the relation between input ignition pulses and multivibrator output.

The monostable multivibrator MV of FIG. 2 is shown in greater detail in FIG. 3. Rectifiers CR2, CR3, together with resistors R13 and R14 apply the input ignition pulse and illumination intelligence to the bases BQ6 and BQ9. Normally, Q6 is "off" and Q7 is "on." Therefore, Q8 is "off," and Q4 is "on," which implies the lights are "off."

Now, when ignition pulses are sensed at 31, Q6 and Q9 both turn "on" and capacitor C2 becomes fully discharged. Resistors R13 and R14 avoid "current hugging" between Q6 and Q9.

When C2 is fully discharged, the voltage at point A, $V_A$, is reduced almost to 0 volts which turns Q7 "off." Feedback from Q7 will turn Q6 "on" and hold it "on" for as long as Q7 is "off." During this time, C2 begins to charge $$V_A = (V_{supp} - V_{satQ6})[1 - e^{-t/R_5C_2}],$$

for $V_A = 1.4$ v
$V_{supp} = 5.2$ V.
$V_{satQ6} = 0.1$ v.
$R_5 = 25$ KΩ
$C_2 = 6$ $\mu f$
$t = 37.5$ m secs.

which is longer than any possible period between ignition pulses after or at idle. $t$ will actually be greater than 37.5ms, due to arc duration.

After the first ignition pulse, Q6 turns on and remains on because C2 is charging. When the second ignition pulse arrives, Q6 is unable to change the state of the capacitor, but, in the meantime, Q9 turns on and discharges C2. Consequently, C2 holds $V_a < 2V_{BE}$ where $V_{BE}$ is the base-to-emitter voltage of Q9, for as long as ignition pulses continue.

It will have become apparent that the time constant $R_5C_2$ associated with the circuit can be made extremely long. Consequently, when the last ignition pulse appears, the lights will remain on for a period of time defined by the width of the output pulse of the multivibrator which may be on the order of several seconds. Furthermore, the circuit identifies the first ignition pulse, i.e., the leading edge of the monostable wave form, as well as the last igination pulse, i.e., $t$ pulse time prior to the trailing edge of the monostable wave form. It will be clear that, after the last ignition pulse, the lights will remain "on" for a period of time as directed by the time constant of R5C2.

The apparatus serves its several functions independently of the position of the ignition switch of the vehicle. However, the headlight switch may be incorporated in the invention in two distinct ways:

a. A set of switch contacts may be introduced between BQ2 and ground. These contacts need be rated at only a few milliamperes in contrast to those presently used. When these contacts are closed, Q2 will be "off" and will still inhibit ignition pulses. When these contacts are open then ignition pulses will appear across BQ2.

b. Q1 and ID may be removed and the set of switch contacts referred to in the preceding subparagraph (a) are introduced between EQ2 and ground. In this case, the functions previously performed by ID are assumed by the driver of the vehicle by controlling the headlight switch. If the mentioned set of contacts is closed, the circuit will function as though ID were in the circuit and the ambient illumination had fallen below the predetermined level. If these contacts are opened, the situation would be as if ID were in the circuit and the ambient illumination were high. In brief, by inserting the set of contacts, the functions of ID are performed manually.

It will be understood that by choosing a low level of ambient illumination which is still sufficient to activate the apparatus, one may have the headlights come on even during the daytime when the engine is running. In this way, the vehicle will be more readily detectable in its surroundings.

I claim:

1. Apparatus for controlling the headlights of a vehicle driven by an internal combustion engine including an electrical ignition system, in accordance with an ambient light condition comprising: a photoelectric device responsive to said condition, means connected to the ignition system to provide a train of pulses corresponding at least in periodicity to the firing pulses of the ignition system, circuit means responsive to the output of said device and said pulses jointly, a pulse generator to be triggered by said ignition pulses when said device provides an output corresponding to a low level of ambient illumination justifying an "on" condition of the headlights and vice versa, the time constant of the pulse generator being so determined as to provide for a length of pulse in excess of the period of the successive ignition pulses and circuit means connected to the output of the pulse generator to control the "on" and "off" condition of the headlights.

2. Apparatus in accordance with claim 1 in which the means utilizing the detector output information and the ignition pulse information comprises a pair of transistors, one of said pair being individual to the ignition pulse circuit, and having its base connected thereto, and the other thereof being individual to the detector output circuit and having its base connected thereto, the emitter of the said one transistor being connected to the collector of said other transistor, the collector of the said one transistor being connected to the input of the pulse generator to apply a triggering signal thereto and to provide phase reversal of the signal from said one transistor prior to applying the same as a triggering pulse.

3. Apparatus in accordance with claim 1 further characterized in that the headlight filaments are connected with the power source of the vehicle in a series circuit which comprises a unidirectional current flow device having a gate, the output of the pulse generator being connected to the gate to control flow of current to the filaments in accordance with the output of the pulse generator.

4. Apparatus in accordance with claim 1 further characterized by an emergency switch to by-pass the output of the pulse generator in the absence of pulses therefrom and to enable manual operation of the headlights independently of the generator output.

5. The combination in accordance with claim 1 in which the duration of said excess is so regulated by the RC constant of the generator as to allow the headlights to remain "on" after the ignition is switched "off."

6. Apparatus in accordance with claim 1 further characterized in that the headlight filaments are connected with the power source of the vehicle in a series circuit with a relay having actuating means, the output of the pulse generator being connected to said means to control flow of current to the filaments in accordance with the output of the generator.

7. Apparatus in accordance with claim 3 in which said device is a silicon controlled rectifier.

8. Apparatus in accordance with claim 1 in which the pulse generator is a monostable multivibrator, the said multivibrator having a pair of input transistors (Q6, Q9) arranged to constitute an "or" gate by which either transistor can discharge a capacitor (C2), an RC network (R5C2) which defines the pulse width corresponding to a single input pulse, a diode (CR4) connected in series with the base of a transistor (Q7), which requires a higher voltage at the point A which is one junction drop above the base voltage of transistor (Q7) to turn transistor (Q7) "on" which requires higher voltage across capacitor (C2), a feedback network (C3R16), a pair of diodes (CR2, CR3) each connected in series with an individual resistor (R13, R14) to preclude current hugging between the input transistors (Q6, Q9), and a buffer transistor (Q8) connected to the collector of transistor (Q7) through a resistor (R19) connected to the collector of transistor (Q7) to avoid overloading the transistor (Q7) and the feedback network (C3R16).

* * * * *

UNITED STATES PATENT OFFICE
CERTIFICATE OF CORRECTION

Patent No. 3,769,519      Dated October 30, 1973

Inventor(s) Michael R. Adamian

It is certified that error appears in the above-identified patent and that said Letters Patent are hereby corrected as shown below:

Column 2, line 64, "re-insertion" should read -- re-inversion --.

Column 4, line 21, "0" should read -- 6 --;

line 41, the quantity "$-t/R_5C_2$" should read as an exponent;

line 43, "V" should read -- v --;

line 66, "t pulse time" should read -- $^t$ pulse time --.

Signed and sealed this 30th day of April 1974.

(SEAL)
Attest:

EDWARD M.FLETCHER,JR.
Attesting Officer

C. MARSHALL DANN
Commissioner of Patents